US008757344B2

(12) United States Patent
Keating

(10) Patent No.: US 8,757,344 B2
(45) Date of Patent: *Jun. 24, 2014

(54) CORRUGATED STRIP FOR SPLINED CLUTCH HOUSING AND HUB

(75) Inventor: Martin P. Keating, Plainfield, IL (US)

(73) Assignee: BorgWarner Inc., Auburn Hills, MI (US)

( * ) Notice: Subject to any disclaimer, the term of this patent is extended or adjusted under 35 U.S.C. 154(b) by 469 days.

This patent is subject to a terminal disclaimer.

(21) Appl. No.: 13/065,377

(22) Filed: Mar. 21, 2011

(65) Prior Publication Data

US 2012/0217123 A1    Aug. 30, 2012

Related U.S. Application Data

(63) Continuation-in-part of application No. 13/030,257, filed on Feb. 18, 2011, now Pat. No. 8,636,129.

(60) Provisional application No. 61/338,897, filed on Feb. 25, 2010.

(30) Foreign Application Priority Data

Feb. 9, 2011    (DE) .......................... 10 2011 003 824

(51) Int. Cl.
    *F16D 13/62*    (2006.01)
(52) U.S. Cl.
    USPC ......................................... 192/112; 192/70.2

(58) Field of Classification Search
    USPC ...................... 192/70.2, 70.12, 112, 113.34
    See application file for complete search history.

(56) References Cited

U.S. PATENT DOCUMENTS

| 940,679 | A | * | 11/1909 | Evans ........................ 192/70.2 |
| 988,106 | A |   | 3/1911 | Johnston |
| 6,464,058 | B2 |   | 10/2002 | Orlamunder |
| 7,121,392 | B2 |   | 10/2006 | Braford et al. |
| 7,416,067 | B2 | * | 8/2008 | Heinrich et al. ............. 192/70.2 |
| 2004/0060795 | A1 | * | 4/2004 | Schmidt et al. ............. 192/70.2 |
| 2004/0134740 | A1 | * | 7/2004 | Gerathewohl et al. ....... 192/70.2 |
| 2008/0257678 | A1 | * | 10/2008 | Ari ................................ 192/112 |
| 2009/0127053 | A1 | * | 5/2009 | Nosakowski et al. ........ 192/70.2 |
| 2011/0278131 | A1 | * | 11/2011 | Keating et al. ............... 192/112 |

FOREIGN PATENT DOCUMENTS

| EP | 1 950 440 | 7/2008 |
| FR | 1 389 259 | 2/1965 |

* cited by examiner

*Primary Examiner* — David D Le
*Assistant Examiner* — Huan Le
(74) *Attorney, Agent, or Firm* — Warn Partners, P.C.

(57) ABSTRACT

An automotive clutch housing and a method of manufacture thereof is provided. The clutch housing has a cylindrical body that is formed from a form folded strip metal sheet that is later formed into a cylindrical body. The cylindrical body is then joined to a hub to form a clutch housing.

1 Claim, 4 Drawing Sheets

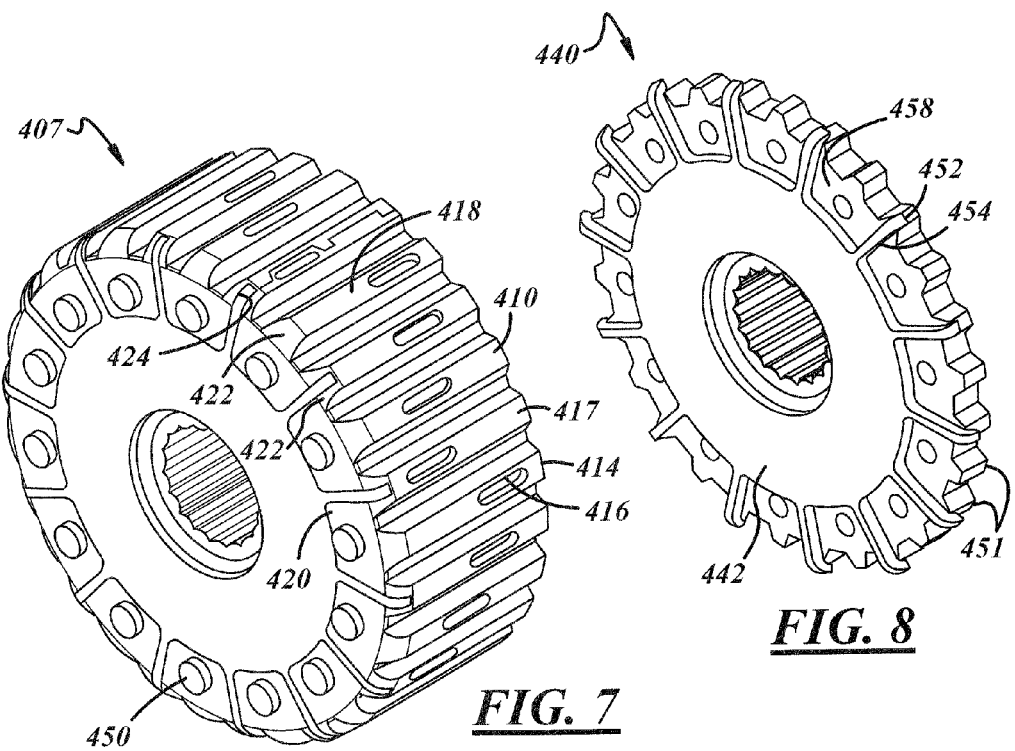
FIG. 7
FIG. 8
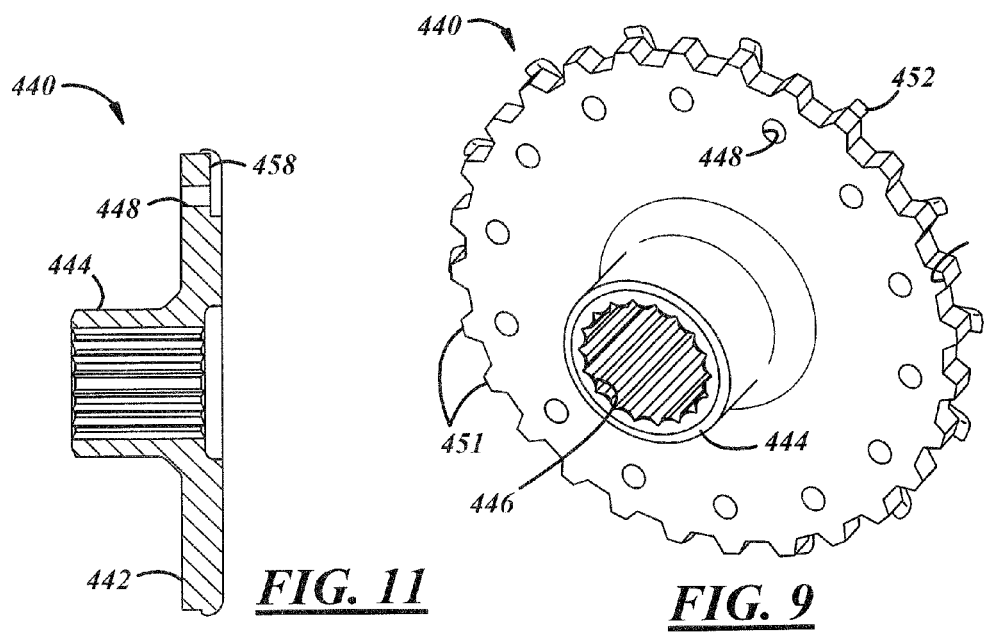
FIG. 11
FIG. 9

CORRUGATED STRIP FOR SPLINED CLUTCH HOUSING AND HUB

CROSS-REFERENCE TO RELATED APPLICATIONS

This application claims priority to U.S. patent application Ser. No. 13/030,257, filed Feb. 18, 2011, which claims the benefit of U.S. Provisional Application No. 61/338,897 filed Feb. 25, 2010.

This application also claims priority to German Patent Application No. 10 2011 003 824.8, filed Feb. 9, 2011, said priority claim being limited to additional disclosure not set forth in U.S. patent application Ser. No. 13/030,257.

FIELD OF THE INVENTION

The present invention relates to clutch housings for automotive transmissions in automotive vehicles such as, but not limited to, passenger vehicles, motor cycles, rough-terrain vehicles and trucks.

BACKGROUND OF THE INVENTION

Many, if not most, automotive clutch housings are fabricated from a cylindrical work piece. Spline teeth are then formed or cut into the cylindrical work piece. It is desirable to provide a clutch housing where the spline teeth of the clutch housing can be formed on a generally flat work piece that is later formed into a cylinder.

SUMMARY OF THE INVENTION

In a preferred embodiment, the present invention provides a clutch housing that is formed from a work piece of sheet strip material. The work piece has spline teeth form folded thereon. The form folded work piece is then formed into a cylinder body and is connected with a hub portion of the clutch housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is a perspective view of the clutch housing shown in FIG. 5;

FIG. 8 is a front perspective view of a hub utilized in the clutch housing shown in FIG. 5;

FIG. 9 is a rear perspective view of the hub shown in FIG. 8;

FIG. 11 is a sectional view of the hub shown in FIG. 8 taken along lines 11-11 of FIG. 10;

DETAILED DESCRIPTION OF THE PREFERRED EMBODIMENTS

The following description of the preferred embodiment(s) is merely exemplary in nature and is in no way intended to limit the invention, its application, or uses.

Figure 1:
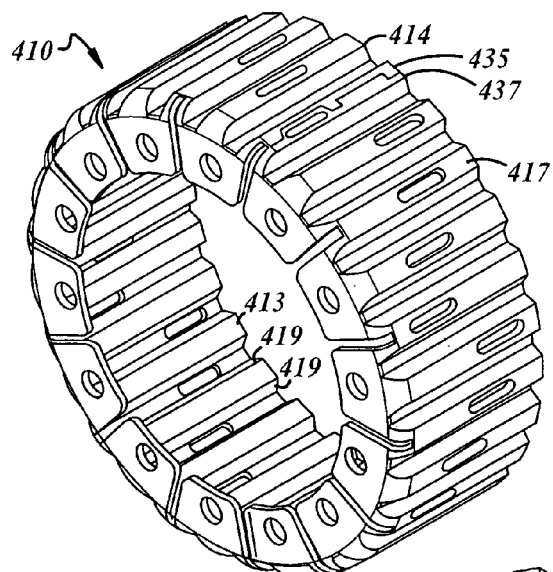
FIG. 1 is a perspective view of a cylindrical body of A clutch housing according to the present invention.
Figure 3:
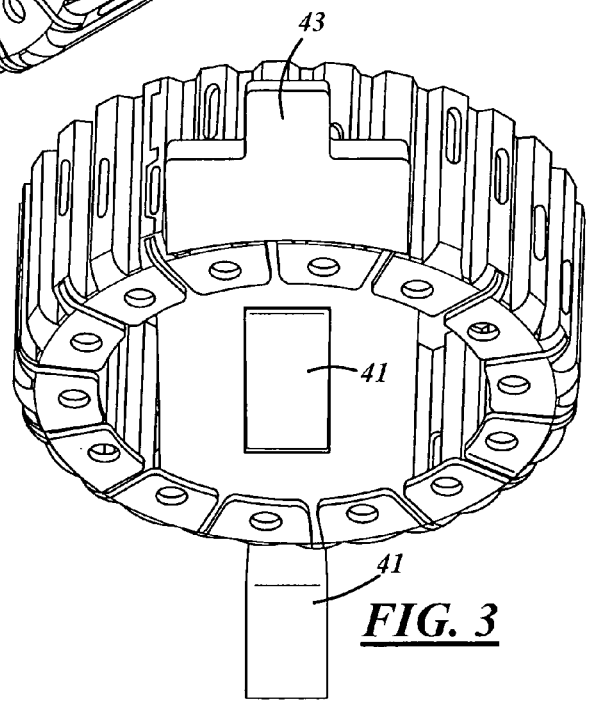
FIG. 3 is a schematic view of a work piece shown in FIG. 2 being form folded by press brake tooling into a cylindrical BODY for the clutch housing of the present invention.
Figure 2:
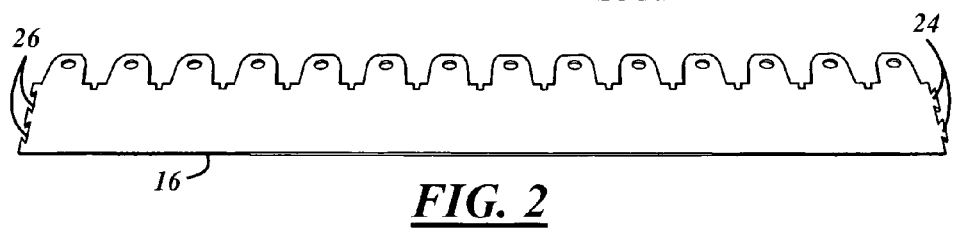
FIG. 2 is a schematic view of a generally flat metallic sheet metal work piece utilized to form THE cylindrical body of the clutch housing of the present invention.

Referring to FIG. 1, cylindrical body 410 for the clutch housing 407 (FIG. 7) according to the present invention is shown. The cylindrical body 410 is fabricated from a fold formed strip sheet metal work piece 16 (FIG. 2). Typically, steel is the material of choice. Typical cylindrical body 410 thicknesses can be approximately 1.5 mm. The cylindrical body 410 has a series of spline teeth 414. The spline teeth 414 of the cylindrical body has an inner flat 413 and an outer flat 417 that are joined by slope portions 419.

Figure 4:
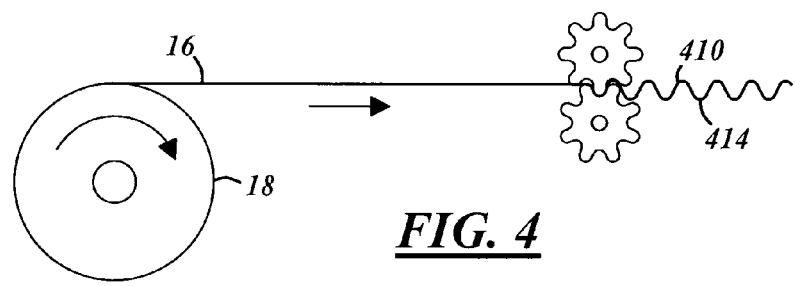
FIG. 4 is a schematic view of an alternative fold forming operation wherein splined teeth of the cylindrical body are formed by a rolling operation.
Figure 6:
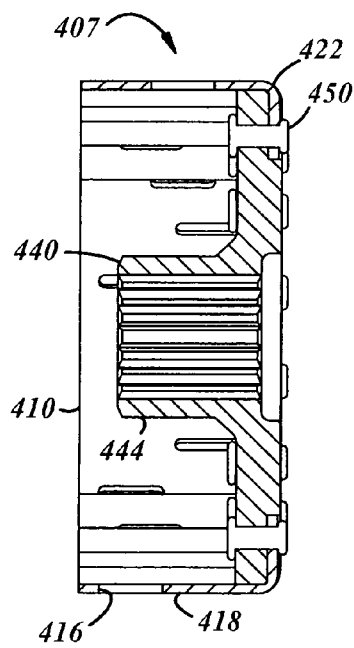
FIG. 6 is a sectional view taken along lines 6-6 of FIG. 5.
Figure 5:
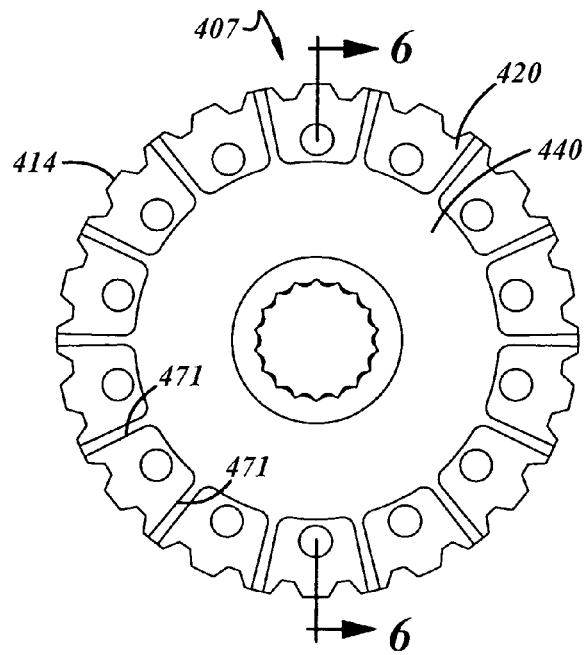
FIG. 5 is a top view of a clutch housing of the present invention.
Figure 12:
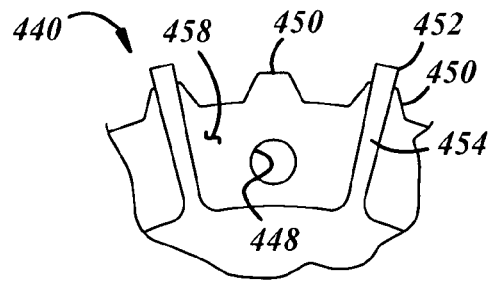
FIG. 12 is an enlargement of a portion that is circled in FIG. 10.
Figure 10:
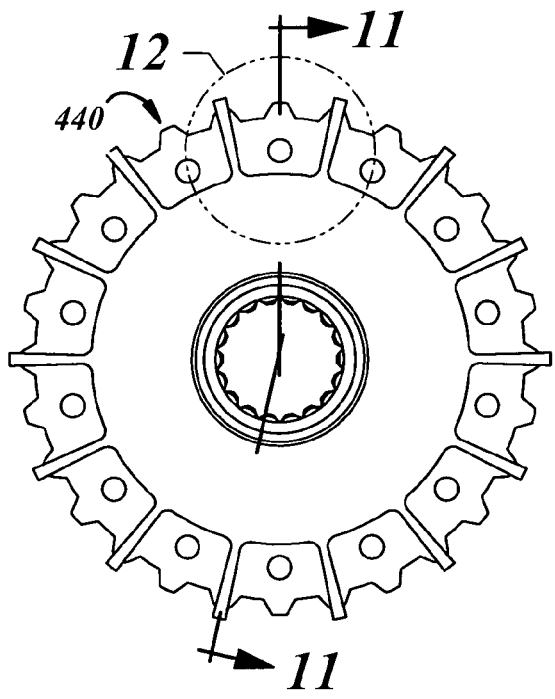
FIG. 10 is a front view of the hub shown in FIG. 8.
Figure 13:
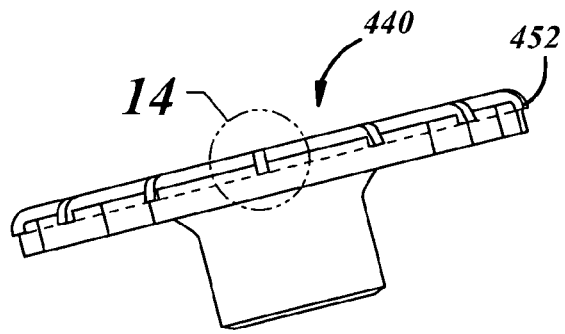
FIG. 13 is a side perspective view of the hub shown in FIG. 8.
Figure 14:
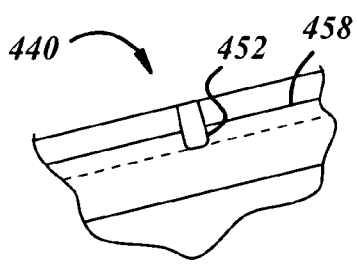
FIG. 14 is an enlargement of a portion 14 encircled in FIG. 13.

To fabricate the cylindrical body from the press brake tooling 41 is utilized having a re-hit portion 43. The press brake tooling 41 and 43 stamp the spline teeth 414 into the shape of the cylindrical body. The spline teeth 414, as schematically shown in FIG. 4, can also be roll formed from a continuous flat strip work piece 16. In a subsequent operation (not shown), an individual cylindrical body 410 is cut off.

The cylindrical body 410 has along its opposite ends, a dove tail interlock joint comprising a male tab 24 (FIG. 2) and a corresponding female cut out 26. The ends of the cylindrical body 435 and 437 are brought together to form the cylindrical shape of the cylindrical body and a connective interlock is formed by the dove tail joint 24, 26 thereafter the ends 435, 437 are joined preferably by welding, clenching or brazing.

Referring to FIGS. 5-14, a clutch housing 407 is provided. As shown, clutch housing 407 will support friction plates on its outer diameter but the clutch housing can be designed to mount friction plates on its inner diameter. Clutch housing 407 has a hub portion 440. In many embodiments, the hub 440 will be fabricated from powered metal. Hub 440 has a disc or planer portion 442 integrally connected with a cylindrical portion 444 having internal spline teeth 446. The hub 440 has a series of apertures 448 to allow for passage of rivet fasteners 450 that connects the hub 440 with the cylindrical body 410. The hub 440 along its peripheral surface has a series of radially projecting gear like teeth 451. Alternating teeth 451 have radial overhangs 452. The radial overhangs 452 are continuous with radial ribs or vanes 454 that are formed by depressions 458 in an outer surface of the hub disc portion 442. Cylindrical body spline teeth 414 have a series of axially alternating positioned oil slots 416. The cylindrical body 410 has a generally axial portion 418 and radially inwardly bent tabs 420. Between the generally axial portion 418 and the radially inwardly bent tabs 420 is a transition region 422. Between the tabs 420 within the transition region 422, there are slots 424. Connecting the generally cylindrical body 410 with the hub 440 are a series of rivets 450. The radial tabs 420 are aligned with the hub depressions 458 and the hub's radial gear like teeth 451 are aligned with the outer radial flat 417 of the spline teeth 414 of the cylindrical body 410. Additionally, the gear teeth 451 aid in supporting the spline teeth 414 in the transition region 422. The vanes 454 and their slot 424 received radial overhangs 452 provide for a circumferential interlock and torsional force transfer to the cylindrical body tabs 420. In the transition region 422, the aforementioned interlock inhibits a propagation of cracks in the cylindrical body 410.

Between the radially inward bent tabs 420 of the cylindrical housing and the disc portion 442 of the hub, there is a torsional interchange facilitated by the rivets 450 and a sheer mold. The tabs 420 lateral sides 471 have an interference fit with the vanes 454 to allow a torsional interchange in a compressive contact mode between the tabs 420 and the vanes 454. Via the overhang 458 of the vanes 454 in the slot 424, there is also a similar compressive torsional interchange between the cylindrical body and the hub in the transition region 422 of the cylindrical body. Typically the hub 440 is also connected to the cylindrical body 410 by the interference connection of the splined teeth 414 with the hub radially projecting gear like teeth 451. Accordingly, a maximum amount of torsional interchange between the hub and cylindrical body is achieved while allowing the material utilized to fabricate the cylindrical body 410 to be as thin as possible while at the same time preventing tears in the material of the cylindrical body. Torsional interchange between the hub and cylindrical body is achieved along the main portion of the radial tab 420 along the peripheral edges of the tab 420 within the transition region 422 and with the circumferential interlock between the hub gear teeth 541 and the cylindrical body splined teeth 414 providing a strong and enduring joint between the hub and cylindrical body.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A clutch housing comprising:
a hub with a cylindrical portion with a splined inner diameter and a disc portion with gear like teeth along its out peripheral edge, said disc portion having a planer disc portion with depressions formed therein forming generally radial ribs, said radial ribs having radial overhangs; and
a generally cylindrical body formed from sheet strip material with splined teeth break fold formed thereon, said cylindrical body splined teeth being aligned and connected with said hub portion gear like teeth, said cylindrical body having tabs bent radially to facilitate fastener connection of said depressions with said hub portion and having a generally lateral interference with said ribs of said hub portion, and said cylindrical body having a transition region between said tabs in a generally axial portion of said cylindrical body with a slot therein accepting said hub radial overhangs and having torsional interchange therewith.

* * * * *

UNITED STATES PATENT AND TRADEMARK OFFICE
CERTIFICATE OF CORRECTION

| | | |
|---|---|---|
| PATENT NO. | : 8,757,344 B2 | Page 1 of 1 |
| APPLICATION NO. | : 13/065377 | |
| DATED | : June 24, 2014 | |
| INVENTOR(S) | : Martin P. Keating | |

It is certified that error appears in the above-identified patent and that said Letters Patent is hereby corrected as shown below:

On the Title Page
Item 30, add -- .8 -- to end of (DE) 10 2011 003 824

Signed and Sealed this
Twenty-third Day of September, 2014

Michelle K. Lee
*Deputy Director of the United States Patent and Trademark Office*